US012620527B2

(12) United States Patent (10) Patent No.: US 12,620,527 B2
Cho (45) Date of Patent: May 5, 2026

(54) ELECTRONIC COMPONENT

(71) Applicant: SAMSUNG ELECTRO-MECHANICS CO., LTD., Suwon-si (KR)

(72) Inventor: Beomjoon Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 98 days.

(21) Appl. No.: 18/530,856

(22) Filed: Dec. 6, 2023

(65) Prior Publication Data

US 2024/0312706 A1 Sep. 19, 2024

(30) Foreign Application Priority Data

Mar. 13, 2023 (KR) ......................... 10-2023-0032770

(51) Int. Cl.
*H01G 2/06* (2006.01)
*H01G 4/012* (2006.01)
*H01G 4/232* (2006.01)
*H01G 4/30* (2006.01)

(52) U.S. Cl.
CPC ............. *H01G 2/065* (2013.01); *H01G 4/012* (2013.01); *H01G 4/2325* (2013.01); *H01G 4/30* (2013.01)

(58) Field of Classification Search
CPC ...... H01G 2/065; H01G 4/012; H01G 4/2325; H01G 4/30
See application file for complete search history.

(56) References Cited

U.S. PATENT DOCUMENTS

| | | | |
|---|---|---|---|
| 6,081,416 A | 6/2000 | Trinh et al. | |
| 2008/0239621 A1 | 10/2008 | Tajuddin et al. | |
| 2009/0296311 A1* | 12/2009 | Otsuka ................. | H01G 4/2325 361/306.3 |
| 2010/0243307 A1 | 9/2010 | McConnell et al. | |
| 2015/0054388 A1* | 2/2015 | Itagaki ................... | H10N 30/50 336/200 |
| 2016/0336296 A1* | 11/2016 | Jeong ................ | H01L 23/49827 |
| 2017/0186539 A1* | 6/2017 | Masuda ................... | H01G 2/06 |

(Continued)

FOREIGN PATENT DOCUMENTS

| | | |
|---|---|---|
| JP | H05-217457 A | 8/1993 |
| JP | 2012-023322 A | 2/2012 |

(Continued)

OTHER PUBLICATIONS

The extended European Search Report dated Aug. 20, 2024 issued in European Patent Application No. 23217101.7.

*Primary Examiner* — Michael P McFadden
(74) *Attorney, Agent, or Firm* — Morgan, Lewis & Bockius LLP

(57) ABSTRACT

An electronic component includes a multilayered capacitor including a capacitor body and an external electrode disposed on one surface of the capacitor body, a frame terminal mounting the multilayered capacitor on a board, and a conductive bonding portion disposed between the board and the frame terminal. The frame terminal includes a base portion including a first material and a surface portion including a second material, and a coefficient of thermal expansion of the frame terminal is greater than that of the capacitor body and is smaller than that of the conductive bonding portion.

21 Claims, 4 Drawing Sheets

(56)     References Cited

U.S. PATENT DOCUMENTS

| | | | |
|---|---|---|---|
| 2018/0247768 A1 | 8/2018 | Koini et al. | |
| 2018/0294100 A1* | 10/2018 | Ando | H01G 4/30 |
| 2021/0358690 A1* | 11/2021 | Iguchi | H01G 2/065 |
| 2022/0102074 A1 | 3/2022 | Hyun et al. | |
| 2024/0087812 A1* | 3/2024 | Iguchi | H01G 4/012 |

FOREIGN PATENT DOCUMENTS

| | | |
|---|---|---|
| JP | 2019-110321 A | 7/2019 |
| KR | 10-1191300 B1 | 10/2012 |

* cited by examiner

ELECTRONIC COMPONENT

CROSS-REFERENCE TO RELATED APPLICATION

This application claims priority to and the benefit of Korean Patent Application No. 10-2023-0032770 filed in the Korean Intellectual Property Office on Mar. 13, 2023, the entire contents of which are incorporated herein by reference.

TECHNICAL FIELD

This disclosure relates to an electronic component, and more particularly, to an electronic component in which a multilayered capacitor is mounted on a board.

BACKGROUND OF THE INVENTION

Electronic components may be down-sized and realize high capacity and thus are used in various electronic devices. Particularly, the electronic components are essentially used for the latest IT devices due to high frequency characteristics and excellent heat resistance.

Recently, with the rapid rise of environmentally friendly and electric vehicles, as electric power driving systems in automobiles are increasing, the demand for the electronic components such as multilayered capacitors required for the automobiles is increasing.

Since automobile parts are required to have high heat resistance and electrical reliability, the electronic components are also required to have more advanced performance.

Accordingly, there is an increasing demand for electronic components capable of realizing high capacity in a limited space or having excellent durability against vibration and deformation.

However, since the conventional electronic components are mounted directly on a board, heat or deformation generated from the board is directly transmitted to the electronic components, failing in securing reliability. Accordingly, a method of protecting the electronic components by bonding a metal frame at the sides thereof to secure a distance between electronic components and board and thus absorb the heat or deformation by the metal is suggested.

However, an increase in a conductive path by bonding of the metal frame may lead to an increase in the equivalent series resistance (ESR) of the electronic component, resulting in side effects such as heat generation and performance degradation. In addition, if a difference in coefficient of thermal expansion (CTE) between the metal frame and the board-mounted solder is excessive, crack defects may occur in the solder bonding portion when high-temperature and low-temperature environments are repeated.

SUMMARY

One aspect of the present disclosure is to suppress an increase in equivalent series resistance by a frame terminal, to prevent solder cracking by reducing stress generated between a frame terminal and a mounting solder when high-temperature and low-temperature environments are repeated, and to provide an electronic component capable of improving high electrical conductivity and high terminal strength characteristics simultaneously.

According to one aspect, an electronic component includes a multilayered capacitor including a capacitor body and an external electrode on one surface of the capacitor body, a frame terminal disposed outside the external electrode and mounting the multilayered capacitor on a board, and a first conductive bonding portion disposed between the board and the frame terminal.

The frame terminal includes a base portion including a first material and a surface portion disposed on a surface of the base portion and including a second material different from the first material.

A coefficient of thermal expansion of the frame terminal is greater than that of the capacitor body and is smaller than that of the first conductive bonding portion.

The coefficient of thermal expansion of frame terminal may be greater than or equal to about 14 ppm/K and less than about 21 ppm/K.

A coefficient of thermal expansion of the capacitor body may be about 9 ppm/K to about 12 ppm/K.

A coefficient of thermal expansion of the first conductive bonding portion may be greater than or equal to about 19 ppm/K and less than about 25 ppm/K.

Electrical conductivity of the frame terminal may be greater than that of the first conductive bonding portion.

The electrical conductivity of the frame terminal may be greater than about 20 MS/m.

The electrical conductivity of the first conductive bonding portion may be less than or equal to about 10 MS/m.

A Young's modulus of the frame terminal may be about 118 GPa to about 150 GPa.

The frame terminal may include a clad in which a thin film-shaped surface portion is disposed on a surface of a sheet-shaped base portion.

The clad may be obtained by overlapping a metal plate including a first material and a metal plate including a second material, and then mechanically bonding the metal plate by rolling.

The first material may include nickel (Ni), iron (Fe), copper (Cu), silver (Ag), chromium (Cr), or an alloy thereof.

The first material may include 42alloy, invar, or stainless304 (SUS304).

The second material may include copper (Cu), gold (Au), zinc (Zn), aluminum (Al), or a combination thereof.

The first conductive bonding portion may include solder or conductive resin paste.

The solder may include an alloy of tin (Sn), silver (Ag), copper (Cu), lead (Pb), antimony (Sb), bismuth (Bi), or a combination thereof.

The solder may include tin (Sn)-silver (Ag)-copper (Cu), tin (Sn)-silver (Ag), or tin (Sn)-lead (Pb).

An average thickness ratio of the base portion and the surface portion may be about 5:5 to about 9:1.

The frame terminal may have an inner surface portion on one surface of the base portion facing the multilayered capacitor and an outer surface portion on another surface of the base portion opposite to the one surface.

An average thickness ratio of the inner surface portion, the base portion, and the outer surface portion may be about 0.5:9.0:0.5 to about 4.0:2.0:4.0.

The electronic component may further include a second conductive bonding portion between the external electrode and the frame terminal. The coefficient of thermal expansion of the frame terminal may be smaller than that of the second conductive bonding portion.

A coefficient of thermal expansion of the second conductive bonding portion may be greater than or equal to about 19 ppm/K and less than about 25 ppm/K.

An electronic component according to another aspect includes a multilayered capacitor including a capacitor body and an external electrode on one surface of the capacitor body, a frame terminal disposed outside the external electrode, and a conductive bonding portion disposed between the external electrode and the frame terminal.

The frame terminal includes a base portion including a first material and a surface portion disposed on a surface of the base portion and including a second material different from the first material.

The coefficient of thermal expansion of the frame terminal is greater than that of the capacitor body and is smaller than that of the conductive bonding portion.

The electronic component according to one aspect may suppress an increase in equivalent series resistance by a frame terminal, prevent solder cracking by reducing stress generated between a frame terminal and a mounting solder when high-temperature and low-temperature environments are repeated, and improve high electrical conductivity and high terminal strength characteristics simultaneously.

DETAILED DESCRIPTION OF THE EMBODIMENTS

Figure 1:
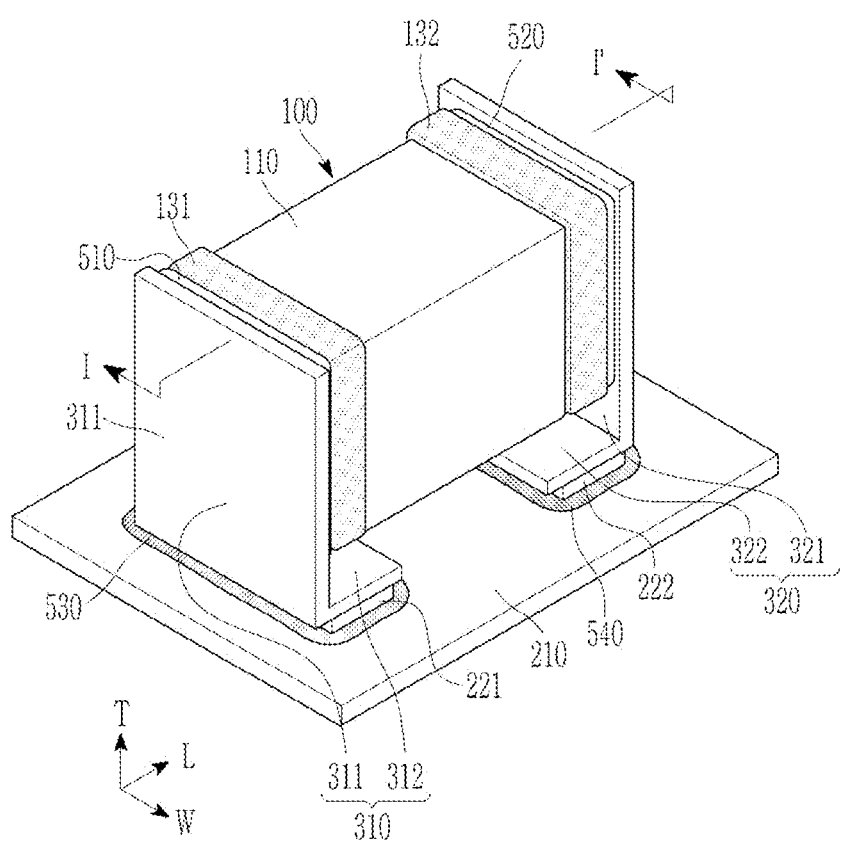
FIG. 1 is a perspective view illustrating an electronic component according to one aspect.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected to," "coupled to," or "facing" another constituent element, it may be connected or coupled directly to the other constituent element or may be connected or coupled to the other constituent element with a further constituent element intervening therebetween. In contrast, it should be understood that, when it is described that an element is "directly coupled to," "directly connected to" or "directly facing" another element, no element is present between the element and the other element.

Throughout the specification, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
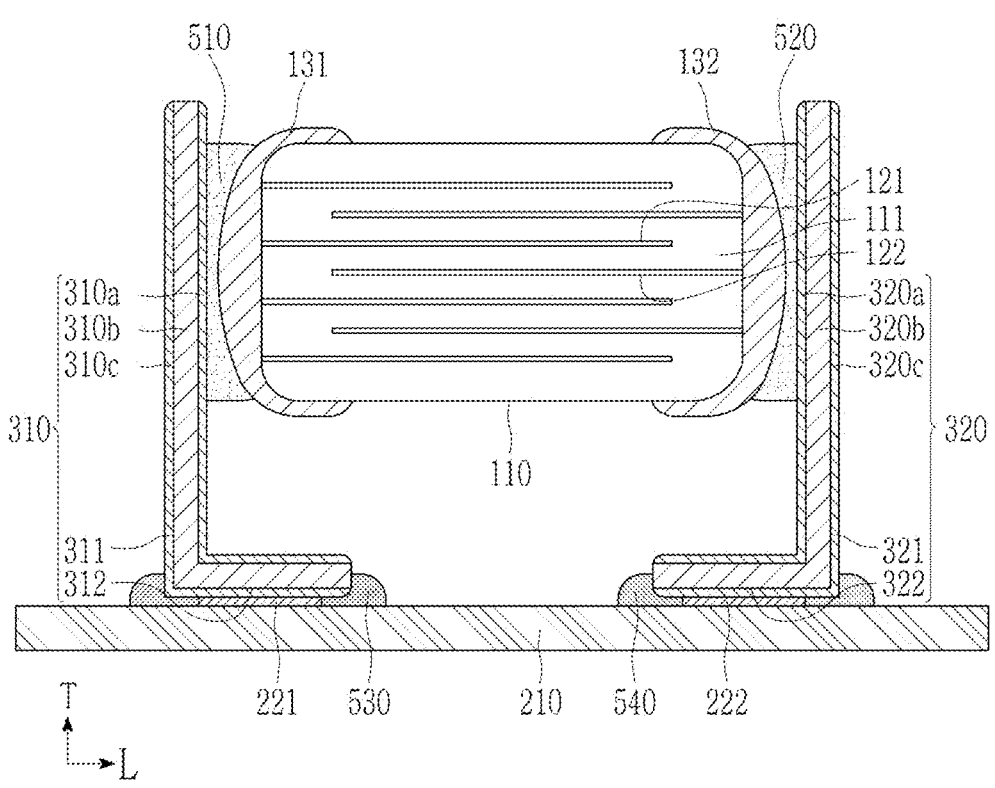
FIG. 2 is a cross-sectional view of the electronic component taken along line I-I' of FIG. 1.
Figure 3:
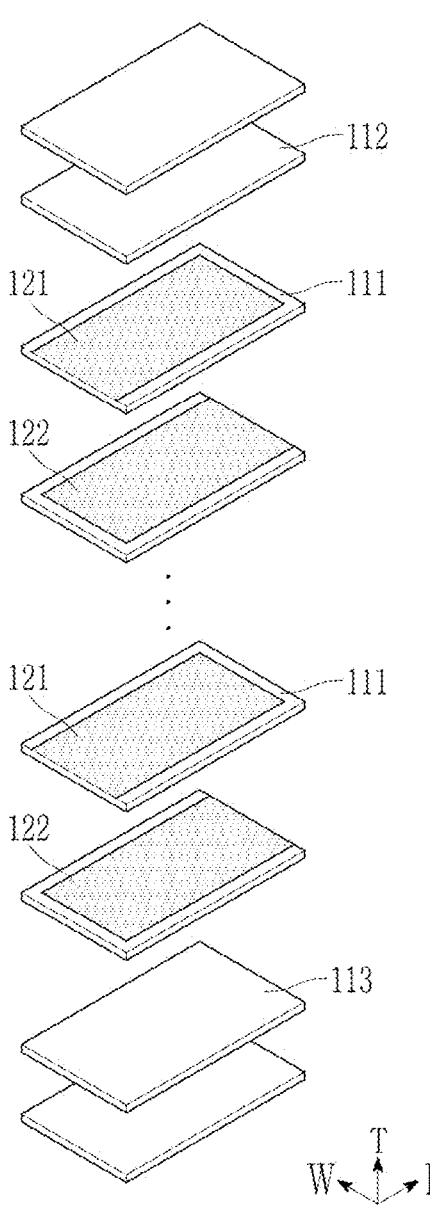
FIG. 3 is an exploded perspective view illustrating a stacked structure of internal electrodes in the multilayered capacitor of FIG. 1.
Figure 4:
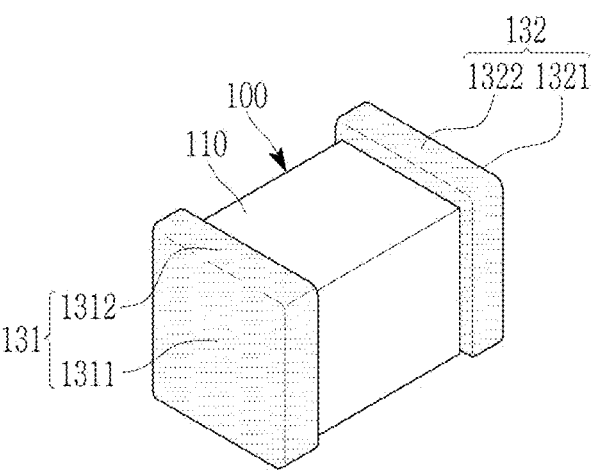
FIG. 4 is a perspective view illustrating the multilayered capacitor of FIG. 1.

FIG. 1 is a perspective view illustrating an electronic component according to one aspect, FIG. 2 is a cross-sectional view of the electronic component taken along line I-I' of FIG. 1, FIG. 3 is an exploded perspective view illustrating a stacked structure of internal electrodes in the multilayered capacitor of FIG. 1, and FIG. 4 is a perspective view illustrating the multilayered capacitor of FIG. 1.

When directions are defined to clearly describe the present embodiment, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Referring to FIGS. 1 to 4, an electronic component according to one aspect includes a multilayered capacitor 100, first and second frame terminals 310 and 320, and first to fourth conductive bonding portions 510, 520, 530, and 540.

The multilayered capacitor 100 includes a capacitor body 110 and first and second external electrodes 131 and 132 disposed at both ends of the capacitor body 110 which face each other in the longitudinal direction (L-axis direction).

The capacitor body 110 may have, for example, a substantially hexahedral shape.

In the present aspect, for convenience of explanation, in the capacitor body 110, both surfaces opposite to each other in the thickness direction (T-axis direction) are defined as first and second surfaces, both surfaces connected to the first and second surfaces and facing each other in the longitudinal direction (L-axis direction) are defined as third and fourth surfaces, and both surfaces connected to the first and second surfaces, connected to the third and fourth surfaces, and facing each other in the width direction (W-axis direction) are defined as fifth and sixth surfaces.

For example, the first surface, which is a lower surface, may be a surface facing a mounting direction. In addition, the first to sixth surfaces may be flat, but the present embodiment is not limited thereto, for example, the first to sixth surfaces may be curved surfaces with a convex central portion, and an edge of each surface which is a boundary, may be round.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the thickness direction (T-axis direction) and then firing them, and includes a plurality of dielectric layers 111, and a plurality of first and second internal electrodes 121 and 122 which are alternately disposed in a thickness direction (T-axis direction) with the dielectric layers 111 interposed therebetween. For example, the first and second internal electrodes 121 and 122 may have different polarities.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating a capacitance of the multilayered capacitor 100. For example, the active region may be a region in which the first and second internal electrodes 121 and 122 are stacked and overlapped with each other along the thickness direction (T-axis direction).

The cover regions 112 and 113 may be respectively disposed on the first and the second surfaces of the active region in the thickness direction (T-axis direction) as margin portions. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a margin portion, and may be respectively disposed on the fifth and sixth surfaces of the active region in the width direction (W-axis direction). Such a side cover region may be formed by coating a conductive paste layer for forming an internal electrode only on a portion of the surface of the dielectric green sheet, stacking dielectric green sheets on which a conductive paste layer is not coated on both side surfaces of the dielectric green sheet, and firing the same.

The cover regions 112 and 113 and the side cover regions serve to prevent damage to the first and second internal electrodes 121 and 122 due to physical or chemical stress.

For example, the dielectric layer 111 may include a ceramic material having a high dielectric constant. For example, the ceramic material may include a dielectric ceramic containing components such as $BaTiO_3$, $CaTiO_3$, $SrTiO_3$, or $CaZrO_3$. In addition, auxiliary components such as a Mn compound, a Fe compound, a Cr compound, a Co compound, and a Ni compound may be further included in addition to these components. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, etc. are partially dissolved in $BaTiO_3$-based dielectric ceramics.

In addition, a ceramic powder, a ceramic additive, an organic solvent, a plasticizer, a binder, a dispersant, and the like may be further added to the dielectric layer 111. The ceramic additive may include, for example, transition metal oxide or transition metal carbide, a rare earth element, magnesium (Mg), or aluminum (Al), and the like.

For example, an average thickness of the dielectric layer 111 may be about 0.5 μm to about 10 μm. In one example, the term "about" may refer to a concept including a minute difference caused by a process error or a measurement error. For example, "about a value" may include not only a case of being "the value", but also a case of having a minute difference caused by a process error or a measurement error, recognizable by one of ordinary skill in the art.

The first and second internal electrodes 121 and 122 are electrodes having different polarities, and are alternately disposed to face each other along the thickness direction (T-axis direction) with the dielectric layer 111 interposed therebetween, and ends thereof may be exposed through the third or fourth surface of the capacitor body 110.

The first and second internal electrodes 121 and 122 may be electrically insulated from each other by the dielectric layer 111 disposed therebetween.

Ends of the first and second internal electrodes 121 and 122 alternately exposed through the third and fourth surfaces of the capacitor body 110 are connected to the first and second external electrodes 131 and 132, respectively, to be electrically connected.

The first and second internal electrodes 121 and 122 may include a conductive metal, for example, a metal such as Ni, Cu, Ag, Pd, or Au, or an alloy thereof, for example an Ag—Pd alloy.

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

For example, each average thickness of the first and second internal electrodes 121 and 122 may be about 0.1 μm to about 2 μm.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the T-axis direction in the active region.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the T-axis direction in the active region.

The first and second external electrodes 131 and 132 may respectively include first and second connection portions 1311 and 1321 disposed on the third and fourth surfaces of the capacitor body 110 and connected to the first and second internal electrodes 121 and 122, and may also include first and second band portions 1312 and 1322 disposed at each corner where the third and fourth surfaces, and the first and second surfaces or the fifth and sixth surfaces of the capacitor body 110 meet.

The first and the second band portions 1312 and 1322 may extend from the first and second connection portions 1311 and 1321 to portions of the first and second surfaces or the fifth and sixth surfaces of the capacitor body 110, respectively. The first and the second band portions may serve to improve adhesion strength of the first and second external electrodes 131 and 132.

In one example, the first and the second external electrodes 131 and 132 may each include a sintered metal layer in contact with the capacitor body 110, a conductive resin layer configured to cover the sintered metal layer, and a plating layer configured to cover the conductive resin layer.

The sintered metal layer may include a conductive metal and glass.

In one example, the sintered metal layer may be a conductive metal and may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, and for example, the copper (Cu) may include a copper (Cu) alloy. When the conductive metal includes copper, a metal other than copper may be included in an amount of less than or equal to about 5 parts based on 100 parts by mole of copper.

For example, the sintered metal layer may include a composition in which oxides are mixed with glass, and may include, for example, at least one selected from silicon oxide, boron oxide, aluminum oxide, transition metal oxide, alkali metal oxide, and alkaline earth metal oxide. Herein, the transition metal may be selected from zinc (Zn), titanium (Ti), copper (Cu), vanadium (V), manganese (Mn), iron (Fe), and nickel (Ni); the alkali metal may be selected from lithium (Li), sodium (Na), and potassium (K); and the alkaline-earth metal may be selected from magnesium (Mg), calcium (Ca), strontium (Sr), and barium (Ba).

In the sintered metal layer, contents of the conductive metal and the glass are not particularly limited, but an average area of the conductive metal on the cross-section (cross-section in the L-axis direction and T-axis direction) perpendicular to the thickness direction (W-axis direction) of the multilayered capacitor 100 may be, for example, about 30% to about 90% or about 70% to about 90% of a total area of the sintered metal layer.

Optionally, the conductive resin layer is formed on the sintered metal layer and, for example, may entirely cover the sintered metal layer. On the other hand, the first external electrode 131 and the second external electrode 132 may not include the sintered metal layer, and in this case, the conductive resin layer may directly contact the capacitor body 110.

The conductive resin layer extends toward the first and the second surfaces or the fifth and sixth surfaces of the capacitor body 110. A length of a region (i.e., band portions 1312 and 1322) disposed by the conductive resin layer extending to the first and the second surfaces or the fifth and sixth surfaces of the capacitor body 110 may be longer than that of a region (i.e., band portions 1312 and 1322) disposed by the sintered metal layer extending to the first and the second surfaces or the fifth and sixth surfaces of the capacitor body 110. In other words, the conductive resin layer is formed on the sintered metal layer and may entirely cover the sintered metal layer.

The conductive resin layer includes a resin and a conductive metal.

The resin included in the conductive resin layer is not particularly limited, as long as the resin has bondability and impact absorption and is mixed with the conductive metal powder into a paste, and, for example, may include a phenol resin, an acrylic resin, a silicone resin, an epoxy resin, or a polyimide resin.

The conductive metal included in the conductive resin layer may play a role of electrically connecting the first internal electrode 121 and the second internal electrode 122 or the sintered metal layer.

The conductive metal included in the conductive resin layer may have a spherical shape, a flake shape, or a combination thereof. In other words, the conductive metal may have the flake shape alone or the spherical shape alone, but the flake shape and the spherical shape may be mixed.

Herein, the spherical shape may not be a perfectly spherical shape, for example, a length ratio of a major axis to a minor axis (major axis/minor axis) may be about 1.45 or less. The flake-shaped powder means powder having a flat and elongated shape, and the length ratio of the major axis to the minor axis (major axis/minor axis) is not particularly limited but for example, about 1.95 or more.

The first and second external electrodes 131 and 132 may further include a plating layer outside the conductive resin layer.

The plating layer is nickel (Ni), copper (Cu), tin (Sn), palladium (Pd), platinum (Pt), gold (Au), silver (Ag), tungsten (W), titanium (Ti), or lead (Pb), alone or an alloy thereof. For example, the plating layer may be a nickel (Ni) plating layer or a tin (Sn) plating layer, and may have a form in which a nickel (Ni) plating layer and a tin (Sn) plating layer are sequentially stacked or a tin (Sn) plating layer, a nickel (Ni) plating layer, and a tin (Sn) plating layer are sequentially stacked. In addition, the plating layer may include a plurality of nickel (Ni) plating layers and/or a plurality of tin (Sn) plating layers.

The plating layer may improve mountability of the board 210 the multilayered capacitor 100 with a board, structural reliability, external durability, heat resistance, and equivalent series resistance (ESR).

The first and second frame terminals 310 and 320 are respectively disposed outside the first and second external electrodes 131 and 132 in the longitudinal direction (L-axis direction). For example, the multilayered capacitor 100 is disposed between the first and second frame terminals 310 and 320.

The first frame terminal 310 includes a first supporting portion 311 extending in the stacking direction (T-axis direction), and a first mounting portion 312 extending from the lower end of the first supporting portion 311 in the longitudinal direction (L-axis direction).

The second frame terminal 320 includes second supporting portion 321 facing the first supporting portion 311 and extending in the longitudinal direction (L-axis direction) and a second mounting portion 322 extending in the longitudinal direction (L-axis direction) at the lower end of the second supporting portion 321.

According to this structure, the first and second frame terminals 310 and 320 may substantially have a 'L' shape, and each end of the first and second frame terminals 310 and 320 may be disposed to face each other in the longitudinal direction (L-axis direction).

The first and second frame terminals 310 and 320 include the first and second base portions 310*b* and 320*b* and first and second surface portions 310*a* and 320*a* disposed on the surfaces of the first and second base portions 310*b* and 320*b*.

The first and second base portions 310*b* and 320*b* include the first material, and the first and second surface portions 310*a* and 320*a* include the second material different from the first material.

Herein, the coefficient of thermal expansion of the first and second frame terminals 310 and 320 may be larger than that of the capacitor body 110 but smaller than that of the first to fourth conductive bonding portions 510, 520, 530, and 540.

The coefficient of thermal expansion of the first and second frame terminals 310 and 320 may be larger than that of the capacitor body 110 but closer to that of the first to fourth conductive bonding portions 510, 520, 530, and 540 to reduce stress generated between the first and second frame terminals 310 and 320 and the first to fourth conductive bonding portions 510, 520, 530, and 540, when high-temperature and low-temperature environments are repeated, and resultantly, prevent solder cracks.

The coefficient of thermal expansion of the first and second frame terminals 310 and 320 may be greater than or equal to about 14 ppm/K and less than about 21 ppm/K, or greater than or equal to about 17 ppm/K less than about 19 ppm/K. The coefficient of thermal expansion of the first and second frame terminals 310 and 320 may be measured by preparing a sample with a width of greater than or equal to about 10 cm, a length of greater than or equal to about 5 cm, and a uniform thickness of greater than or equal to about 100 µm and using a thermomechanical analyzer at room temperature (about 20° C.) to about 300° C.

When the coefficient of thermal expansion of the first and second frame terminals 310 and 320 is less than about 14 ppm/K, more cracks in the first to fourth conductive bonding portions 510, 520, 530, and 540 may occur, and when the coefficient of thermal expansion of the first and second frame terminals 310 and 320 is greater than or equal to about 21 ppm/K, more cracks may occur in the capacitor body 110 bonded with the first and second frame terminals 310 and 320.

For example, the coefficient of thermal expansion of the capacitor body 110 may be about 9 ppm/K to about 12 ppm/K.

For example, the coefficients of thermal expansion of the first to fourth conductive bonding portions 510, 520, 530, and 540 may be greater than or equal to about 19 ppm/K and less than about 25 ppm/K.

For example, the first and second frame terminals 310 and 320 may be clads in which the thin film-shaped first and second surface portions 310a and 320a are coated on the surface of sheet-shaped first and second base portions 310b and 320b, for example, the clad may be obtained by over-lapping a metal plate including the first material and a metal plate including the second material and then, mechanically bonding them by rolling.

Herein, the electrical conductivity (specific conductivity) of the first and second frame terminals 310 and 320 is higher than that of the first to fourth conductive bonding portions 510, 520, 530, and 540.

Through the first and second frame terminals 310 and 320 with the clad structure in which two or more materials are combined, high electrical conductivity, resistance against solder cracks, and high terminal strength characteristics, which are difficult to satisfy by a single material, may be simultaneously improved.

The higher the electrical conductivity of the first and second frame terminals 310 and 320 than that of the first to fourth conductive bonding portions 510, 520, 530, and 540, the better, for example, the electrical conductivity may be greater than about 20 MS/m. The electrical conductivity of the first and second frame terminals 310 and 320 may be calculated by measuring resistance (R) of a sample whose length (I) and area (A) are known and using Equation 1.

$$\sigma = \frac{l}{RA} \qquad \text{[Equation 1]}$$

The electrical conductivity of the first to fourth conductive bonding portions 510, 520, 530, and 540 may be less than or equal to about 10 MS/m or 1 MS/m to about 2 MS/m.

The Young's modulus of the first and second frame terminals 310 and 320 may be about 118 GPa to about 150 GPa or about 120 GPa to about 140 GPa. The Young's modulus (E) of the first and second frame terminals 310 and 320 may be obtained by preparing a sample with a rod shape, for example, a dog-bone shape and then, measuring stress (σ) and displacement (ε), while pulling the sample by a tensile tester and using Equation 2.σ

$$E = \frac{\sigma}{\varepsilon} \qquad \text{[Equation 2]}$$

When the first and second frame terminals 310 and 320 have a Young's modulus of less than about 118 GPa, the first and second frame terminals 310 and 320 may be deformed and damaged, and when the Young's modulus of the first and second frame terminals 310 and 320 is greater than about 150 GPa, more cracks may occur in the first to fourth conductive bonding portions 510, 520, 530, and 540 due to the increased stress on the interface.

The first and second base portions 310b and 320b of the first and second frame terminals 310 and 320 include the first material, for example, the first material may include nickel (Ni), iron (Fe), copper (Cu), silver (Ag), chromium (Cr), or an alloy thereof. For example, the first material may include 42alloy, invar, or stainless304 (SUS304). Herein, the 42alloy is an alloy of iron with about 42% of nickel, invar is an alloy of iron with about 36% of nickel, stainless304 is an alloy of iron with about 8% to about 11% of nickel and about 18% to about 20% of chromium.

For example, the first and second base portions 310b and 320b may have an average thickness of about 0.05 mm to about 0.5 mm.

The first and second surface portions 310a and 320a may include the second material different from the first material, for example, the second material may include copper (Cu), gold (Au), zinc (Zn), aluminum (Al), or a combination thereof.

The first and second surface portions 310a and 320a may be disposed on the surfaces of the first and second base portions 310b and 320b facing the first and second external electrodes 131 and 132 of the multilayered capacitor 100, and the first and second frame terminals 310 and 320 may further include third and fourth surface portions 310c and 320c disposed on the opposite sides of the first and second surface portions 310a and 320a. Herein, the first and second surface portions 310a and 320a may be referred to as inner surface portions, and the third and fourth surface portions 310c and 320c may be outer surface portions.

In this way, when the first to fourth surface portions 310a, 320a, 310c, 320c are disposed symmetrically on both surfaces of the first and second base portions 310b and 320b, the first and second frame terminals 310 and 320 with the clad structure may secure stability of the bonding portions of different materials. Herein, the material of the first and second surface portions 310a and 320a may be the same as that of the third and fourth surface portions 310c and 320c.

For example, the first to fourth surface portions 310a, 320a, 310c, 320c may have an average thickness of about 0.2 μm to about 5.0 μm or about 1.0 μm to about 5.0 μm.

The first and second base portions 310b and 320b and the first and second surface portions 310a and 320a may have an average thickness ratio of about 5:5 to about 9:1. In addition, when the first and second frame terminals 310 and 320 include the first and second surface portions 310a and 320a and the third and fourth surface portions 310c and 320c, the first and second surface portions 310a and 320a, the first and second base portions 310b and 320b, and the third and fourth surface portions 310c and 320c may have a thickness ratio of about 0.5:9.0:0.5 to about 4.0:2.0:4.0.

Herein, the average thickness of the first and second base portions 310b and 320b and the first and second surface portions 310a and 320a may be an arithmetic mean of thicknesses of the first and second base portions 310b and 320b and thicknesses of the first and second surface portions 310a and 320a at 3, 5, or 10 points randomly selected on a cross-section of the first and second frame terminals cut at a ½ of the width direction (W-axis direction) in the stacking direction (T-axis direction) perpendicular to the width direction (W-axis direction).

When the first and second base portions 310b and 320b and the first and second surface portions 310a and 320a have an average thickness ratio within the range, the thicknesses of the first and second base portions 310b and 320b determining thermal expansion and material strength may be sufficiently secured.

The first and second external electrodes 131 and 132 of the multilayered capacitor 100 are respectively connected with the first and second frame terminals 310 and 320. In order to achieve this, the electronic component includes first and second conductive bonding portions 510 and 520.

The first conductive bonding portion 510 is disposed between the first external electrode 131 and the first frame terminal 310, and the second conductive bonding portion 520 is disposed between the second external electrode 132 and the second frame terminal 320.

In addition, the first and second frame terminals 310 and 320 mount the multilayered capacitor 100 on the board 210. For example, the first and second frame terminals 310 and 320 are electrically connected with first and second electrode pads 221 and 222 of the board 210. In order to achieve this, the electronic component includes third and fourth conductive bonding portions 530 and 540.

The third conductive bonding portion 530 is disposed between the first frame terminal 310 and the board 210, and the fourth conductive bonding portion 540 is disposed between the second frame terminal 320 and the board 210.

For example, the first to fourth conductive bonding portions 510, 520, 530, and 540 are solders but may include a conductive adhesive such as a conductive resin paste and the like.

The solder may include an alloy of tin (Sn), silver (Ag), copper (Cu), lead (Pb), antimony (Sb), bismuth (Bi), or a combination thereof. For example, the solder may include tin (Sn)-silver (Ag)-copper (Cu), tin (Sn)-silver (Ag), and tin (Sn)-lead (Pb).

When the solder is a tin alloy having the above composition, a coefficient of thermal expansion of the first to fourth conductive bonding portions 510, 520, 530, and 540 may be greater than or equal to about 19 ppm/K and less than about 25 ppm/K, and the electrical conductivity of the first to fourth conductive bonding portions 510, 520, 530, and 540 may be less than or equal to about 10 MS/m.

The board 210 may be, for example, a conductor board, and the conductor board may be an FR4 board. In addition, the board 210 may be a ceramic board. For example, the board 210 may be a direct copper bonded board (DCB) in which copper is coated on a ceramic.

The board 210 may include first and second electrode pads 221 and 222 disposed apart from each other in the longitudinal direction (L-axis direction).

In the multilayered capacitor 100, the first and second mounting portions 312 and 322 of the first and second frame terminals 310 and 320 may be mounted on the board 210, while placed in contact with the first and second electrode pads 221 and 222 of the board 210. In other words, the first mounting portion 312 may be electrically and physically connected to the first electrode pad 221 and bonded therewith by the third conductive bonding portion 530, and the second mounting portion 322 may be electrically and physically connected to the second electrode pad 222 and bonded therewith by the fourth conductive bonding portion 540.

Hereinafter, specific embodiments of the invention are presented. However, the examples described below are only for specifically illustrating or explaining the invention, and the scope of the invention is not limited thereto.

Preparation Examples: Manufacturing of Electronic Component

Example 1

A 42alloy metal plate and a copper (Cu) metal plate are overlapped and mechanically bonded by rolling, preparing a clad-type frame terminal in which first and second surface portions including copper (Cu) (average thickness: 30 μm) are coated on both surfaces of a base portion including the 42alloy (average thickness: 60 μm).

The prepared frame terminal is used to mount a multilayered capacitor on a board. Herein, a solder including 96.5Sn-3Ag-0.5Cu is used.

Example 2

An invar metal plate and a copper (Cu) metal plate are overlapped and then, mechanically bonded by rolling, preparing a clad-type frame terminal in which first and second surface portions including copper (Cu) (average thickness: 30 μm) are coated on both surfaces of a base portion including the invar (average thickness: 60 μm).

The prepared frame terminal is used to mount a multilayered capacitor on a board. Herein, a solder including 96.5Sn-3Ag-0.5Cu is used.

Example 3

A stainless304 metal plate and a copper (Cu) metal plate are overlapped and then, mechanically bonded by rolling, preparing a clad-type frame terminal in which first and second surface portions (average thickness: 30 μm) including copper (Cu) (average thickness: 60 μm) are coated on both surfaces of a base portion including the stainless304.

The prepared frame terminal is used to mount a multilayered capacitor on a board. Herein, a solder including 96.5Sn-3Ag-0.5Cu is used.

Comparative Example 1

A frame terminal formed of a 42alloy metal plate (average thickness: 120 μm) alone is manufactured.

The prepared frame terminal is used to mount a multilayered capacitor on a board. Herein, a solder including 96.5Sn-3Ag-0.5Cu is used.

Comparative Example 2

A frame terminal formed of an invar metal plate (average thickness: 120 μm) alone is manufactured.

The prepared frame terminal is used to mount a multilayered capacitor on a board. Herein, a solder including 96.5Sn-3Ag-0.5Cu is used.

Comparative Example 3

A frame terminal formed of a stainless304 metal plate (average thickness: 120 μm) alone is manufactured.

The prepared frame terminal is used to mount a multilayered capacitor on a board. Herein, a solder including 96.5Sn-3Ag-0.5Cu is used.

Experimental Example: Measurement of Physical Properties of Frame Terminals and Performance of Electronic Components A coefficient of thermal expansion, electrical conductivity, and Young's modulus of the frame terminals manufactured in the examples and the comparative examples are measured and summarized in Table 1.

The coefficient of thermal expansion of each frame terminal may be measured by preparing a sample with a width of 10 cm or more, a length of 5 cm or more, a uniform thickness of 100 μm or more and using a thermomechanical analyzer at room temperature (20° C.) to 300° C.

The electrical conductivity of each frame terminal may be obtained by measuring resistance (R) of a sample whose length (I) and area A are known and using Equation 1.

The Young's modulus of each frame terminal may be obtained by preparing a sample with a dog-bone shape, measuring stress (σ) and displacement (ε), while pulling the sample with a tensile tester, and using Equation 2.

On the other hand, the capacitor bodies of the examples and the comparative examples have a coefficient of thermal expansion of 7 ppm/K to 12 ppm/K. The solders used in the examples and the comparative examples have a coefficient of thermal expansion of 23.5 ppm/K and electrical conductivity of 1.39 MS/m.

TABLE 1

| | Coefficient of thermal expansion [ppm/K] | Electrical conductivity [MS/m] | Young's Modulus [GPa] |
|---|---|---|---|
| Comparative Example 1 | 5.3 | 1.45 | 145 |
| Comparative Example 2 | 17.3 | 1.39 | 190 |
| Comparative Example 3 | 16.5 | 59.2 | 117 |
| Example 1 | 5.7 | 23.6 | 128 |
| Example 2 | 16.8 | 18.4 | 148 |
| Example 3 | 15.6 | 23.1 | 137 |

In addition, the electronic components of the examples and the comparative examples are measured with respect to a solder crack defect rate after temperature cycles, equivalent series resistance (ESR), and a terminal strength defect rate, and the results are shown in Table 2.

The solder crack defect rate is evaluated by polishing the board mounted with the multilayered capacitor on through the frame terminal in a horizontal direction to expose the bonding interface of the conductive bonding portion and the frame terminal and examining it with an optical microscope at 30 times or more magnification. When a length of a crack on the interface of the conductive bonding portion and the frame terminal is greater than 30% of that of the examined cross-section, it is judged as a defect.

The equivalent series resistance (ESR) is measured in a resonant frequency band of the corresponding multilayered capacitor by using an LCR meter.

The terminal strength defect rate is determined as a defect, when the multilayered capacitor is detached, or the frame terminal is damaged, by mounting ten multilayered capacitors on a board and applying a force of 10 N at 1 mm/min for 10 seconds thereto from the side thereof.

TABLE 2

| | Solder crack defect rate after temperature cycle [%] | | ESR [mΩ] | Terminal strength defect rate [%] |
|---|---|---|---|---|
| | 1000 hr | 2000 hr | | |
| Comparative Example 1 | 30 | 100 | 13 | 0 |
| Comparative Example 2 | 5 | 25 | 14 | 0 |
| Comparative Example 3 | 0 | 0 | 6 | 10 |
| Example 1 | 25 | 90 | 7.2 | 0 |
| Example 2 | 0 | 0 | 8.1 | 0 |
| Example 3 | 0 | 0 | 6.8 | 0 |

The stress due to the temperature cycles affecting the crack defect rate may be calculated according to Equation 3.

$$\text{Magnitude of stress } (\sigma) = \qquad \text{[Equation 3]}$$
$$\text{coefficient of thermal expansion } (\alpha) \times$$
$$\text{Young's modulus } (E) \times \text{temperature change } (\Delta T)$$

Equation 3 shows that when a frame terminal has a low coefficient of thermal expansion, which is more different from 23.5 ppm/K of a coefficient of thermal expansion of a mounting solder, or the Young's modulus increases, the interface stress increases.

In Tables 1 and 2, samples, in which a frame terminal has a low coefficient of thermal expansion and thus a larger difference from a coefficient of thermal expansion of a mounting solder, or samples, in which a frame terminal has a relatively high Young's modulus, exhibit solder crack defects. On the other hand, Comparative Example 3 and Examples 3 and 4, in which a frame terminal has a high coefficient of thermal expansion and a relatively low Young's modulus, exhibit no solder cracks.

In addition, comparing Comparative Example 1 with Example 3, when a coefficient of thermal expansion of a frame terminal is sufficiently high, even though a Young's modulus of the frame terminal is slightly high, since solder cracks do not occur, which confirms that the coefficient of thermal expansion of the frame terminal may have greater influences.

The frame terminal of Comparative Example 3 includes a material having high electrical conductivity and thus exhibits no solder cracks due to low ESR and a high coefficient of thermal expansion, but since the frame terminal has a relatively low Young's modulus and low strength, the frame terminal may be damaged after mounted on the board.

As in the examples, when a frame terminal is configured to have a clad structure to secure a closer coefficient of thermal expansion to a mounting solder, high electrical conductivity, and a low Young's modulus by combining individual materials having drawbacks in some characteristics, solder cracks, ESR, and terminal strength defect rates, which are difficult to satisfy with a single material, may be all improved.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. An electronic component, comprising:
a multilayered capacitor including a capacitor body and an external electrode on one surface of the capacitor body;
a frame terminal disposed outside the external electrode and mounting the multilayered capacitor on a board; and
a first conductive bonding portion disposed between the board and the frame terminal,
wherein the capacitor includes dielectric layers and internal electrodes,
wherein the frame terminal includes:
a base portion including a first material; and
a surface portion disposed on a surface of the base portion and including a second material different from the first material,
a coefficient of thermal expansion of the frame terminal including the base portion and the surface portion is greater than that of the capacitor body including the dielectric layers and the internal electrodes and is smaller than that of the first conductive bonding portion,
wherein the frame terminal includes a clad in which a thin film-shaped surface portion is disposed on a surface of a sheet-shaped base portion,
wherein the first material includes 42 alloy, invar, or stainless 304 (SUS304), and
wherein an average thickness ratio of the base portion and the surface portion is about 5:5 to about 7:3.

2. The electronic component of claim 1, wherein the coefficient of thermal expansion of the frame terminal is greater than or equal to about 14 ppm/K and less than about 21 ppm/K.

3. The electronic component of claim 1, wherein the coefficient of thermal expansion of the capacitor body is about 9 ppm/K to about 12 ppm/K.

4. The electronic component of claim 1, wherein the coefficient of thermal expansion of the first conductive bonding portion is greater than or equal to about 19 ppm/K and less than about 25 ppm/K.

5. The electronic component of claim 1, wherein electrical conductivity of the frame terminal is greater than that of the first conductive bonding portion.

6. The electronic component of claim 5, wherein the electrical conductivity of the frame terminal is greater than about 20 MS/m.

7. The electronic component of claim 5, wherein the electrical conductivity of the first conductive bonding portion is less than or equal to about 10 MS/m.

8. The electronic component of claim 1, wherein a Young's modulus of the frame terminal is about 118 GPa to about 150 GPa.

9. The electronic component of claim 1, wherein the first material includes nickel (Ni), iron (Fe), copper (Cu), silver (Ag), chromium (Cr), or an alloy thereof.

10. The electronic component of claim 1, wherein the second material includes copper (Cu), gold (Au), zinc (Zn), aluminum (Al), or a combination thereof.

11. The electronic component of claim 1, wherein the first conductive bonding portion includes solder or conductive resin paste.

12. The electronic component of claim 11, wherein the solder includes an alloy of tin (Sn), silver (Ag), copper (Cu), lead (Pb), antimony (Sb), bismuth (Bi), or a combination thereof.

13. The electronic component of claim 12, wherein the solder includes tin (Sn)-silver (Ag)-copper (Cu), tin (Sn)-silver (Ag), or tin (Sn)-lead (Pb).

14. The electronic component of claim 1, wherein the frame terminal has an inner surface portion on one surface of the base portion facing the multilayered capacitor and an outer surface portion on another surface of the base portion opposite to the one surface.

15. The electronic component of claim 1, further comprising a second conductive bonding portion between the external electrode and the frame terminal,
wherein the coefficient of thermal expansion of the frame terminal is smaller than that of the second conductive bonding portion.

16. The electronic component of claim 15, wherein a coefficient of thermal expansion of the second conductive bonding portion is greater than or equal to about 19 ppm/K and less than about 25 ppm/K.

17. An electronic component, comprising:
a multilayered capacitor including a capacitor body and an external electrode on one surface of the capacitor body;
a frame terminal disposed outside the external electrode; and
a conductive bonding portion disposed between the external electrode and the frame terminal,
wherein the capacitor includes dielectric layers and internal electrodes,
wherein the frame terminal includes a base portion including a first material and a surface portion disposed on a surface of the base portion and including a second material different from the first material, and
a coefficient of thermal expansion of the frame terminal including the base portion and the surface portion is greater than that of the capacitor body including the dielectric layers and the internal electrodes and is smaller than that of the conductive bonding portion,
wherein the frame terminal includes a clad in which a thin film-shaped surface portion is disposed on a surface of a sheet-shaped base portion,
wherein the first material includes 42 alloy, invar, or stainless304 (SUS304), and
wherein an average thickness ratio of the base portion and the surface portion is about 5:5 to about 7:3.

18. The electronic component of claim 17, wherein the coefficient of thermal expansion of the frame terminal is greater than or equal to about 14 ppm/K and less than about 21 ppm/K.

19. The electronic component of claim 17, wherein the coefficient of thermal expansion of the capacitor body is about 9 ppm/K to about 12 ppm/K.

20. The electronic component of claim 17, wherein the coefficient of thermal expansion of the conductive bonding portion is greater than or equal to about 19 ppm/K and less than about 25 ppm/K.

21. The electronic component of claim 17, wherein electrical conductivity of the frame terminal is greater than that of the conductive bonding portion.

\* \* \* \* \*